United States Patent
Paul (10) Patent No.: US 9,314,884 B2
(45) Date of Patent: Apr. 19, 2016

(54) METHOD OF REMANUFACTURING HYDRAULIC CYLINDERS, AND REMANUFACTURED HYDRAULIC CYLINDERS

(76) Inventor: Zbigniew Robert Paul, University Park, FL (US)

( * ) Notice: Subject to any disclaimer, the term of this patent is extended or adjusted under 35 U.S.C. 154(b) by 910 days.

(21) Appl. No.: 13/437,080

(22) Filed: Apr. 2, 2012

(65) Prior Publication Data

US 2012/0247322 A1    Oct. 4, 2012

Related U.S. Application Data

(60) Provisional application No. 61/470,557, filed on Apr. 1, 2011.

(51) Int. Cl.
  *B23P 6/00* (2006.01)
  *F15B 15/14* (2006.01)

(52) U.S. Cl.
  CPC .............. *B23P 6/00* (2013.01); *F15B 15/1457* (2013.01); *Y10T 29/4927* (2015.01)

(58) Field of Classification Search
  CPC ............................. B23P 6/00; F15B 15/1457
  USPC ................................ 92/169.1, 128; 29/888.06
  See application file for complete search history.

(56) References Cited

U.S. PATENT DOCUMENTS

| | | | | |
|---|---|---|---|---|
| 5,960,674 | A | * | 10/1999 | Brockmeyer .................... 74/582 |
| 7,115,324 | B1 | * | 10/2006 | Stol et al. ...................... 428/594 |

OTHER PUBLICATIONS

Tractor-Holic, Hydraulic Cylinder Forum Posts available at http://www.mytractorforum.com/archive/index.php/t-96542.html.*
Robert Keith, Adhesive Bonding of Stainless Steels-Including Precipitation-Hardening Stainless Steels, National Aeronautics amd Space Administration, 1967.*

* cited by examiner

*Primary Examiner* — Edward Look
*Assistant Examiner* — Daniel Collins
(74) *Attorney, Agent, or Firm* — The Watson I.P. Group, PLC; Jovan N. Jovanovic; Vladan M. Vasiljevic (57) ABSTRACT

A method of remanufacturing a cylinder assembly that has a shaft body and a slidable cylinder assembly extending thereover. A plurality of seals extend between the shaft body and the slidable cylinder to provide a plurality of fluid-tight chambers. The shaft body has opposing ends with a first end cap positioned at a first end and a second end cap positioned at a second end thereof. The shaft body is permanently coupled to the end caps to preclude removal thereof. The method requires cutting the shaft body to remove the end caps, and subsequent reattachment.

6 Claims, 10 Drawing Sheets

METHOD OF REMANUFACTURING HYDRAULIC CYLINDERS, AND REMANUFACTURED HYDRAULIC CYLINDERS

CROSS-REFERENCE TO RELATED APPLICATION

This application claims priority from U.S. Prov. Pat. App. No. 61/470,557, filed Apr. 1, 2011, entitled Method of Disassembling, Repairing, and Reassembling Hydraulic Cylinder Ends, the entire specification of which is hereby incorporated by reference in its entirety.

BACKGROUND OF THE DISCLOSURE

1. Field of the Disclosure

The present disclosure is directed to actuators generally, and, more specifically, to remanufacturing of hydraulic cylinder type actuators which are generally deemed as not serviceable.

2. Background Art

The use of hydraulic actuators is well known in the art. Hydraulic actuators, also known as hydraulic cylinders, rams or struts, (and these terms will be used interchangeably below) are widely used in automated machinery including automobiles. The particular hydraulic actuator described below is configured for use in association with an automobile top, in particular, for the purpose of opening and closing the convertible top. The hydraulic cylinder of the type contemplated has hydraulic lines attached to the shaft ends wherein the hydraulic pressure is delivered through the shaft. Generally, the shaft is fixed at one or both ends and the cylinder housing itself is directed to move, to, in turn, provide the required force onto the top mechanism. These features allow the hydraulic cylinder to be externally compact for some specific applications.

Typically, such actuators are usually assembled by welding or crimping components together making them, in most cases, factory sealed and not readily disassembled. Thus, they are generally not repairable; rather, disposal and replacement with a new assembly is the only option. As with most hydraulic actuators, after numerous work cycles and long life, internal parts wear and elastomeric seals decompose, while the majority of the parts are still quite usable. A substantial cost saving over purchasing new actuators can be achieved if internal components such as pistons, seals and cylinder bores can be replaced or refinished.

SUMMARY OF THE DISCLOSURE

The disclosure is directed, in one aspect, to a method of remanufacturing a cylinder assembly that has a shaft body and a slidable cylinder assembly extending thereover. A plurality of seals extend between the shaft body and the slidable cylinder to provide a plurality of fluid-tight chambers. The shaft body has opposing ends with a first end cap positioned at a first end and a second end cap positioned at a second end thereof. The shaft body is permanently coupled to the end cap to preclude removal thereof.

Preferably, the method comprises the steps of cutting the shaft body at each end below the portion of the shaft body that is crimped to the end cap; removing at least the first end cap; removing the slidable cylinder assembly; replacing at least one of the plurality of seals between the shaft body and the slidable cylinder; repositioning the slidable cylinder assembly over the shaft body; and reattaching at least the first end cap with a mechanical attachment.

In a preferred embodiment, the step of reattaching the first end cap with a mechanical attachment further comprises the step of applying an anaerobic adhesive or an epoxy to at least one of a central bore of the shaft body and a shaft engagement portion of the first end cap, and further, joining the shaft body and the first end cap to each other.

In another preferred embodiment, at least a portion of at least one of the shaft body and the first end cap is roughened prior to the step of applying an anaerobic adhesive or an epoxy.

In another preferred embodiment, the method further comprises the steps of providing a groove into a shaft engagement portion of the first end cap; providing a mating groove within a central bore of the first end of the shaft body, wherein the mating groove corresponds to the groove in the shaft engagement portion of the first end cap; and providing a snap ring into one of the grooves and the mating groove, and compressing or expanding, respectively, the snap ring so as to substantially conceal the snap ring within the respective groove; directing the first end cap into the central bore of the shaft body; expanding or compressing the snap ring when the groove and the mating groove correspond so as to extend the snap ring into both grooves, to in turn, lock the shaft body and the first end cap in position relative to each other.

In another preferred embodiment, the same methods can be carried out with respect to the second end cap, wherein the second end cap can be removed and reattached in a similar manner as the first end cap.

In another aspect of the disclosure, the disclosure is directed to a cylinder assembly remanufactured by the method of claim 1. Such a cylinder has a portion of the shaft body that is permanently attached to the first end cap that remains spaced apart from the remainder of the shaft body.

Where both the first and second end caps are removed, a portion of the shaft body that was permanently attached to the first end cap and a portion of the shaft body that was permanently attached to the second end cap remains spaced apart from the remainder of the shaft body.

BRIEF DESCRIPTION OF THE DRAWINGS

The disclosure will now be described with reference to the drawings wherein.

DETAILED DESCRIPTION OF THE DISCLOSURE

While this disclosure is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the disclosure, and some of the components may have been distorted from actual scale for purposes of pictorial clarity.

Figure 1:
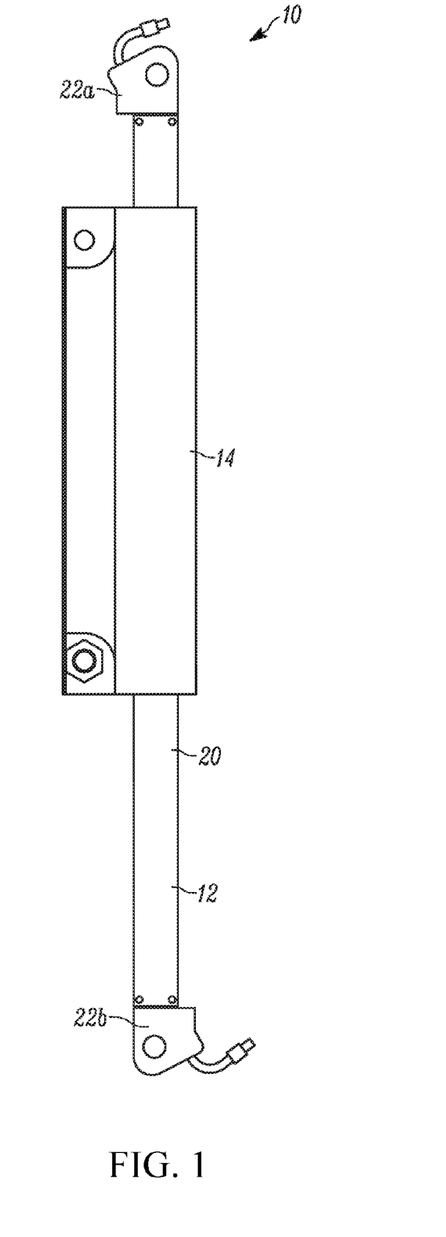
FIG. 1 of the drawings is a front elevational view of the cylinder assembly which is remanufacturable under the method of the present disclosure.

Referring now to the drawings and in particular to FIG. 1, cylinder assembly is shown generally at 10. The cylinder assembly is merely an exemplary embodiment of a cylinder assembly, and the disclosure is not limited to the particular cylinder assembly shown in the figures. The particular cylinder assembly is utilized for movement of the convertible top for a late mode Porsche 911 (a 996). As indicated above, the particular method and cylinder assembly, as remanufactured can be used in association with a number of different hydraulic cylinders, and for a number of different applications.

The cylinder assembly 10 is shown in FIG. 1 as comprising shaft assembly 12, and slidable cylinder assembly 14. The shaft assembly 12 is shown as comprising shaft body 20, and, first and second end caps 22a, 22b, respectively. The shaft body 20, which is shown in more detail in FIG. 5, comprises a metal member (stainless steel, steel, aluminum, or another metal or alloy) which includes first end 30, second end 32 and outer surface 36. A central bore 34 extends through the entirety of the shaft. Between the first end 30 and the second end 32, and generally midway between the two ends, a central seal 38 is fixedly coupled to the shaft, sealing the first end from the second end, essentially, creating two separate chambers within the central bore, an upper chamber 34a and a lower chamber 34b. A first set of openings 39a are disposed on one side of the central seal 38. A second set of openings 39b are disposed on the other side of the central seal 38. As will be explained below, the central seal extends outwardly from the outer surface 36, being sized so as to sealingly engage the slidable cylinder assembly 14.

Figure 3:
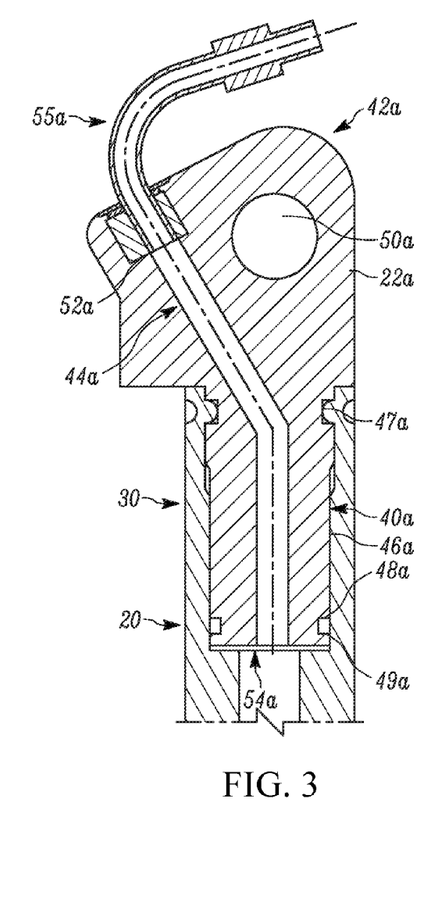
FIG. 3 of the drawings is a partial cross-sectional view of the cylinder assembly which is remanufacturable under the method of the present disclosure, taken generally along lines 3-3 of FIG. 2.
Figure 4:
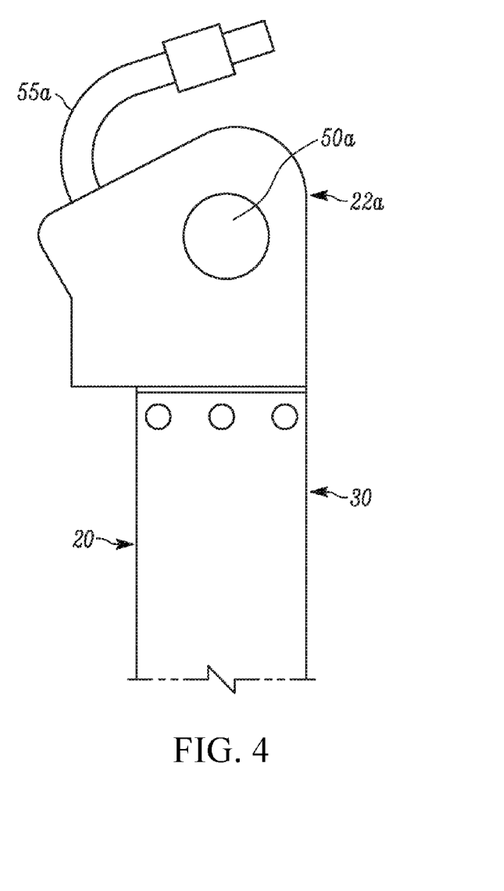
FIG. 4 of the drawings is a partial side elevational view of the cylinder assembly which is remanufacturable under the method of the present disclosure, showing in particular the first end cap and the first end of the shaft body crimped thereto.

With reference to FIGS. 3 and 4, the first end cap 22a includes shaft engagement portion 40a, body engagement portion 42a and fluid bore 44a. The shaft engagement portion 40a includes outer surface 46a which engages the central bore 34 of the shaft body 20 with a generally tight clearance fit. An upper channel 47a extends around at least a portion of the outer surface 46a. The first end 30 of the shaft is crimped into the upper channel 47a to lock the components together, and to preclude relative movement between the components. A lower channel 48a is disposed about the outer surface 46a. The lower channel is configured to receive an o-ring 49a or other resilient sealing member so as to preclude the passage of fluid thereacross.

Body engagement portion 42a of the end cap 22a includes opening 50a through which a threaded fastener is passed prior to engagement with the body of the vehicle or other outside device to which the cylinder is coupled. In other embodiments, various clips, screws, welded or integrated fasteners may be disposed on the body engagement portion to secure the cylinder assembly to an outside structure such as a vehicle. Finally, fluid bore 44a extends through the end cap 22a and includes first end 52a and second end 54a. The first end 52a includes fitting 55a which can be coupled to an outside fluid supply line in a fluid-tight configuration, and coupled to the body in a similar fluid-tight configuration. In the embodiment shown, the fitting comprise a pipe member which, at one end can be coupled to an outside fluid supply line and at another end is sealingly attached to the first end 52a or otherwise coupled thereto. The second end 52a extends to the central bore 34a and provides fluid communication therebetween.

Generally the first end cap 22a comprises a metal member that is machined to the proper dimensions and which includes the desired features. It is contemplated that the first end cap can be formed from multiple members which are coupled together.

Figure 11:
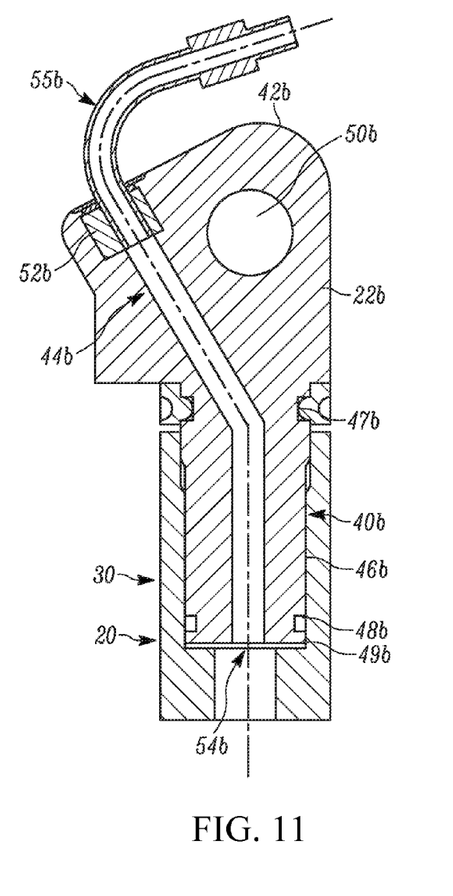
FIG. 11 of the drawings is a partial cross-sectional view of the cylinder assembly which is remanufacturable under the method of the present disclosure, taken generally along lines 11-11 of FIG. 2.
Figure 12:
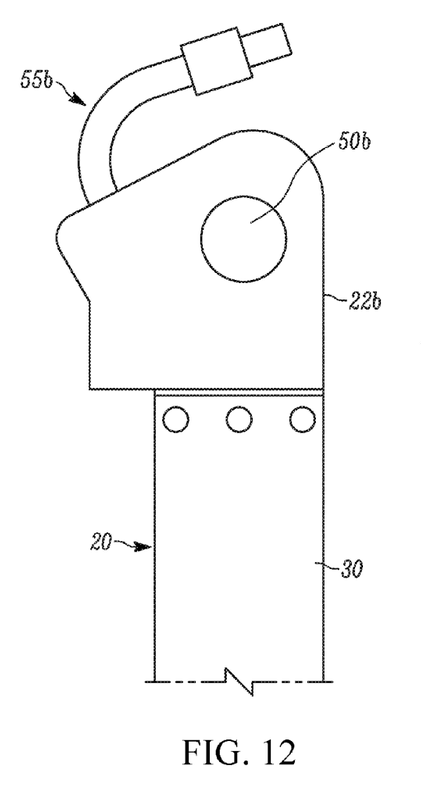
FIG. 12 of the drawings is a partial side elevational view of the cylinder assembly which is remanufacturable under the method of the present disclosure, showing in particular the second end cap and the second end of the shaft body crimped thereto.
Figure 13:
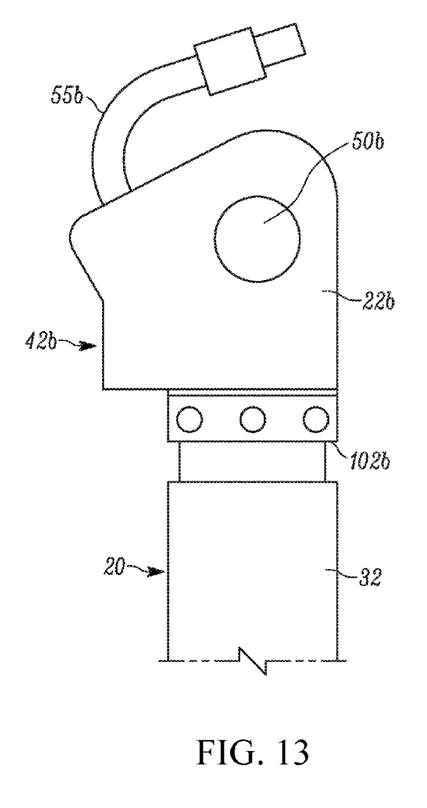
FIG. 13 of the drawings is partial side elevational view of a remanufactured cylinder assembly of the present disclosure.
Figure 14:
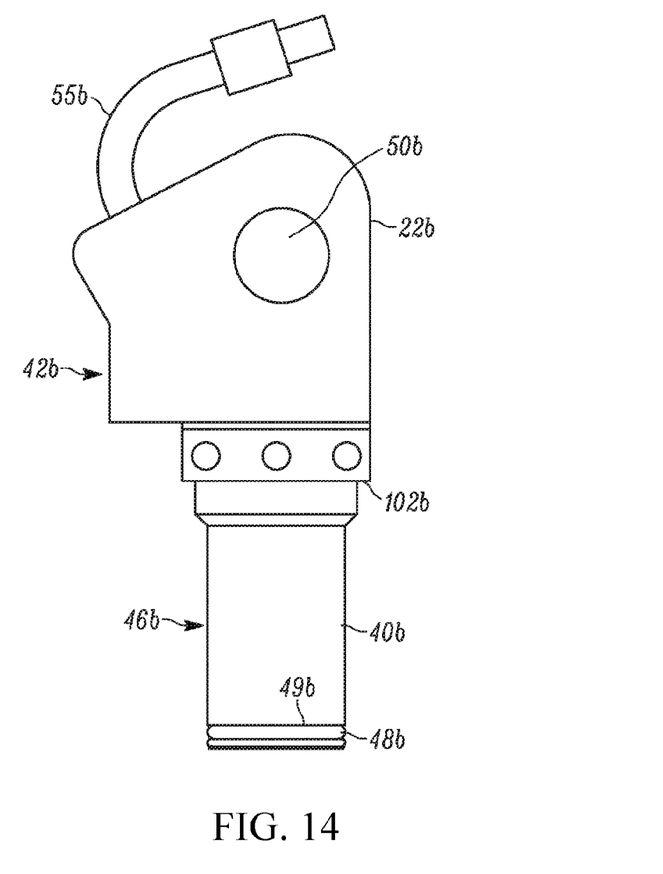
FIG. 14 of the drawings is a side elevational view of a portion of the remanufactured cylinder assembly of the present disclosure, showing, in particular, the second end cap after the portion of the shaft body has been cut and disassembled.
Figure 15:
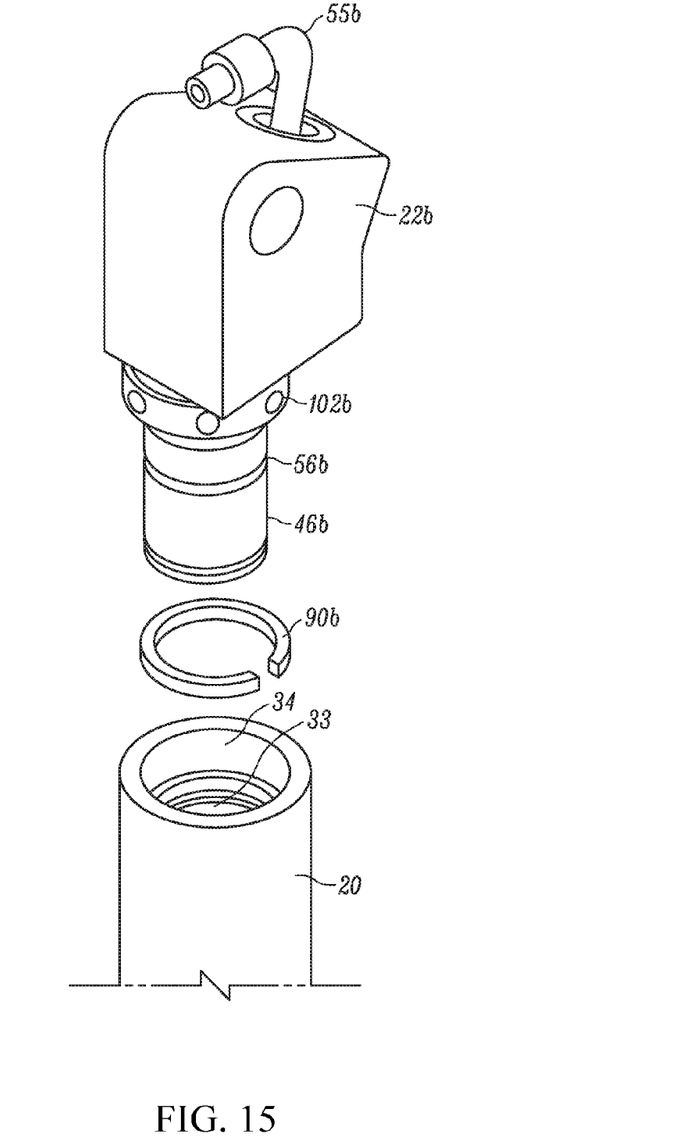
FIG. 15 of the drawings is a partial exploded perspective view of a portion of the remanufactured cylinder assembly of the present disclosure, showing, in part the spring clip and the grooves that are machined or otherwise introduced into the shaft body and the second end cap.
Figure 16:
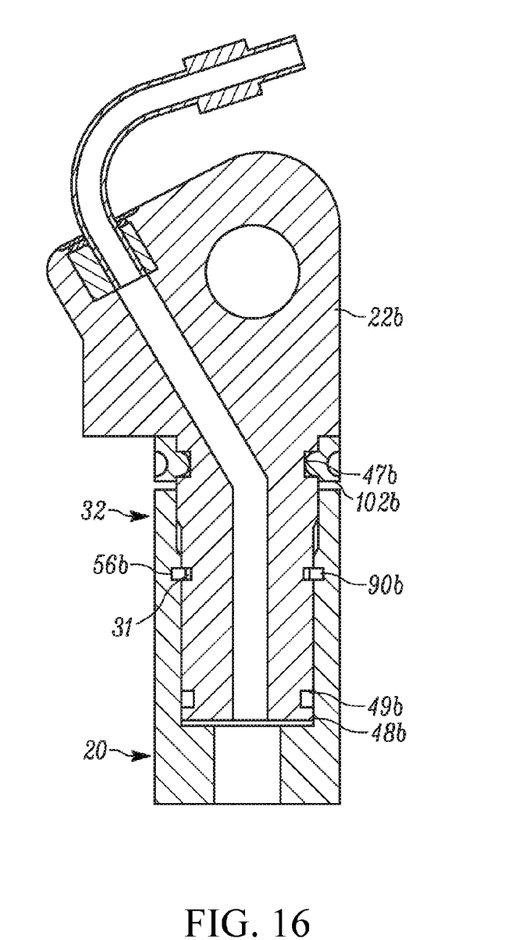
FIG. 16 of the drawings is a partial cross-sectional view of a portion of the remanufactured cylinder assembly shown in FIG. 15 in an assembled configuration.

With reference to FIGS. 11 and 12, the second end cap 22b is functionally equivalent to the first end cap 22a, and will be described herein for purposes of being complete. It will be understood that the ends may have different shapes or configuration, and may be attached to an outside structure differently (or one of the ends may be movable relative to an outside structure. In the embodiment shown, the second end cap 22b comprises shaft engagement portion 40b, body engagement portion 42b and fluid bore 44b. The shaft engagement portion 40b includes outer surface 46b which engages the central bore 34 of the shaft body 20 with a generally tight clearance fit. An upper channel 47b extends around at least a portion of the outer surface 46b. The first end 30 of the shaft is crimped into the upper channel 47b to lock the components together, and to preclude relative movement between the components. A lower channel 48b is disposed about the outer surface 46b. The lower channel is configured to receive an o-ring 49b or other resilient sealing member so as to preclude the passage of fluid thereacross.

Body engagement portion 42b of the end cap 22b includes opening 50b through which a threaded fastener is passed prior to engagement with the body of the vehicle or other outside device to which the cylinder is coupled. In other embodiments, various clips, screws, welded or integrated fasteners may be disposed on the body engagement portion to secure the cylinder assembly to an outside structure such as a vehicle. Finally, fluid bore 44b extends through the end cap 22b and includes first end 52b and second end 54b. The first end 52b includes fitting 55b which can be coupled to an outside fluid supply line in a fluid-tight configuration, and coupled to the body in a similar fluid-tight configuration. In the embodiment shown, the fitting comprise a pipe member which, at one end can be coupled to an outside fluid supply line and at another end is sealingly attached to the first end 52b or otherwise coupled thereto. The second end 52b extends to the central bore 34b and provides fluid communication therebetween.

Generally the second end cap 22b comprises a metal member that is machined to the proper dimensions and which includes the desired features. It is contemplated that the second end cap can be formed from multiple members which are coupled together.

Figure 2:
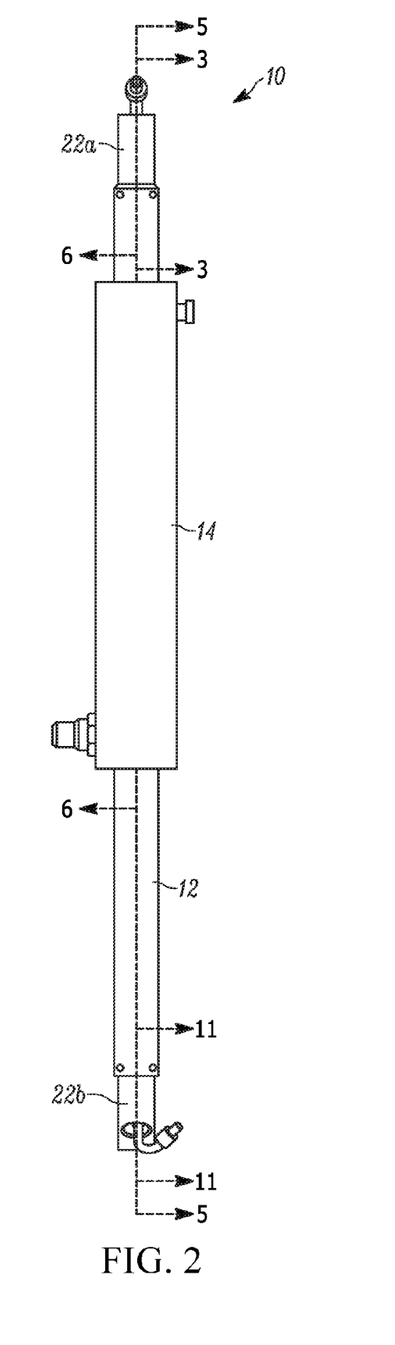
FIG. 2 of the drawings is a side elevational view of the cylinder assembly which is remanufacturable under the method of the present disclosure.
Figure 6:
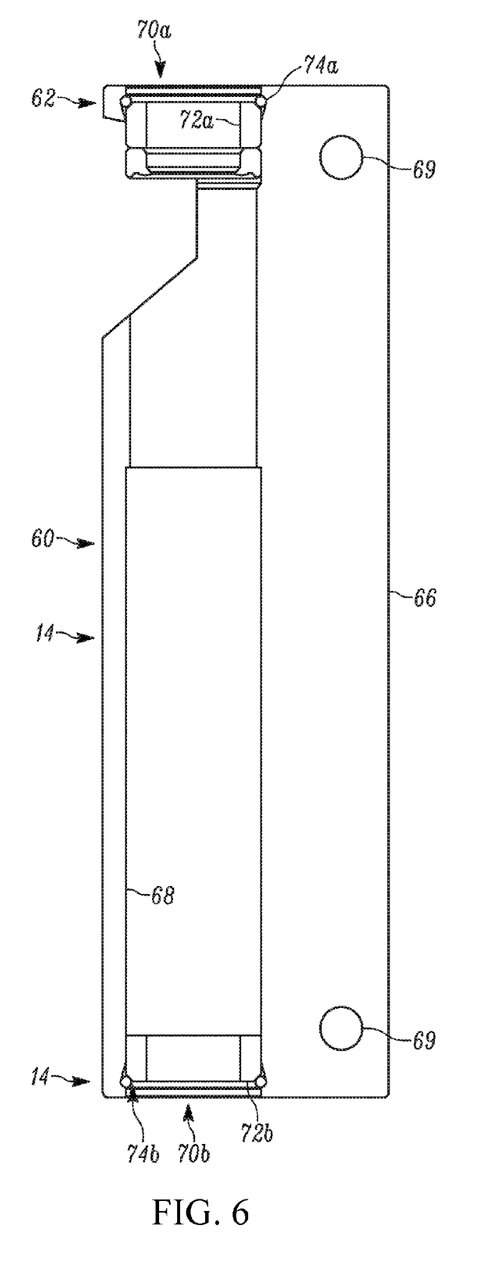
FIG. 6 of the drawings is a cross-sectional view, with a portion cut out thereof, of the slidable cylinder assembly of the cylinder assembly which is remanufacturable under the method of the present disclosure.
Figures 7, 8:
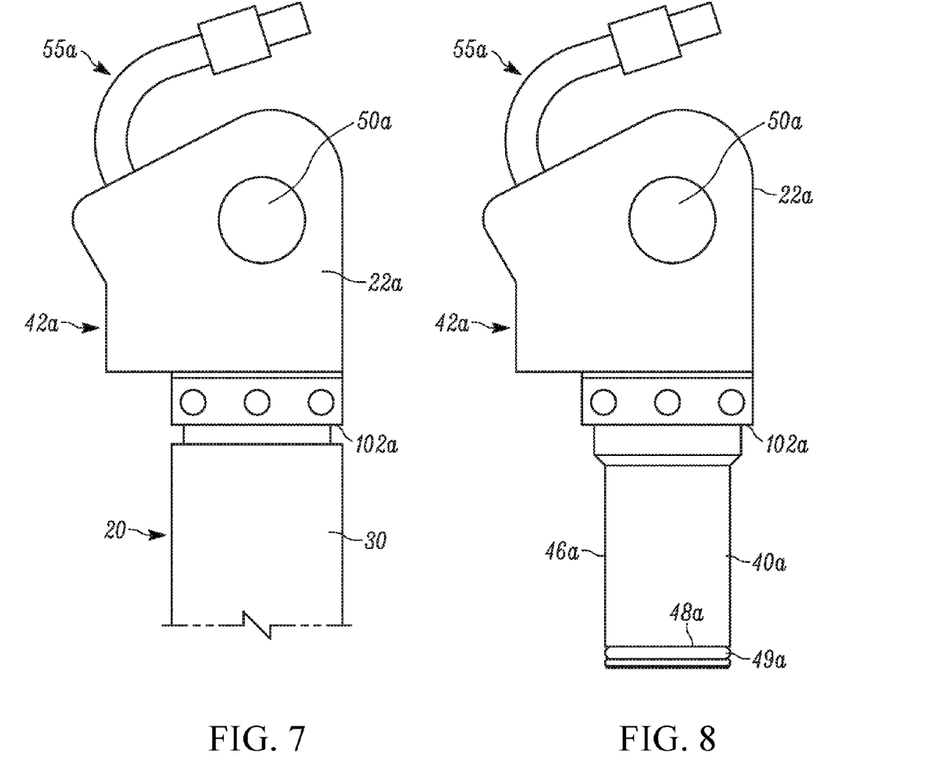
FIG. 7 of the drawings is partial side elevational view of a remanufactured cylinder assembly of the present disclosure.
FIG. 8 of the drawings is a side elevational view of a portion of the remanufactured cylinder assembly of the present disclosure, showing, in particular, the first end cap after the portion of the shaft body has been cut and disassembled.
Figure 9:
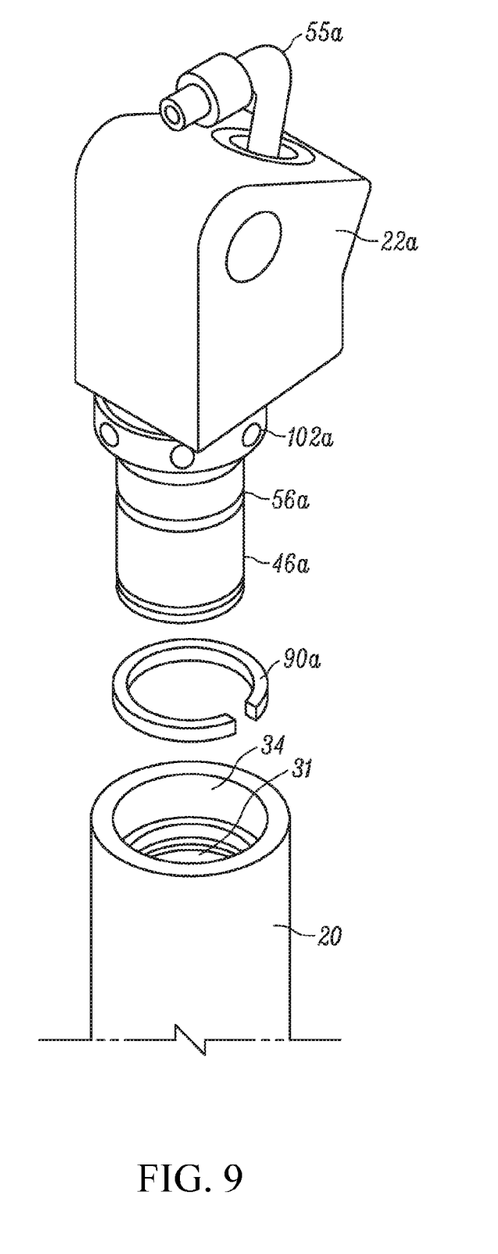
FIG. 9 of the drawings is a partial exploded perspective view of a portion of the remanufactured cylinder assembly of the present disclosure, showing, in part the spring clip and the grooves that are machined or otherwise introduced into the shaft body and the first end cap.
Figure 10:
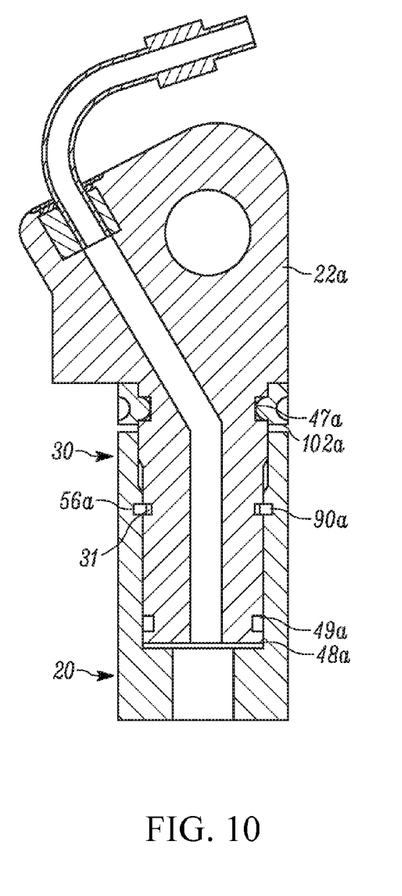
FIG. 10 of the drawings is a partial cross-sectional view of a portion of the remanufactured cylinder assembly shown in FIG. 9 in an assembled configuration.

The slidable cylinder assembly 14 is shown in FIGS. 1 and 2 generally, and in more detail in FIG. 6 as comprising cylinder body 60 and seal assemblies 70a, 70b. The cylinder body 60 includes first end 62, second end 64, flange 66 and inner bore 68. The flange 66 includes connectors 69. The cylinder body 60 is generally cylindrical and the inner bore 68 is larger than the shaft body 20 over which it is extended. The flange 66 and the connectors 69 facilitate attachment of the cylinder body to portions of the convertible top, or to the body of the vehicle, as desired (or to other outside structures).

Figure 5:
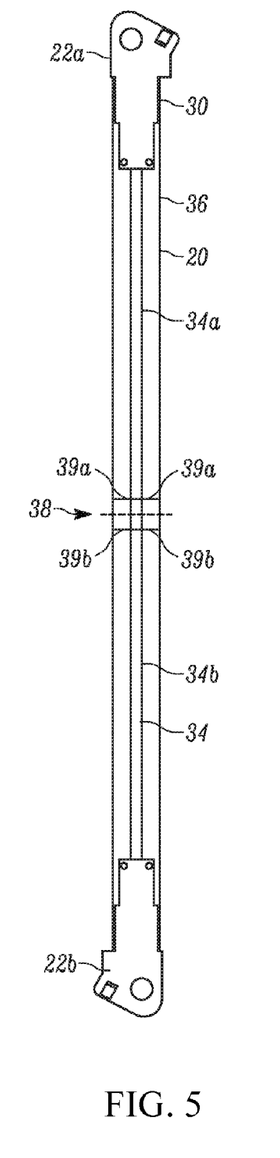
FIG. 5 of the drawings is a cross-sectional view of the shaft assembly of the cylinder assembly which is remanufacturable under the method of the present disclosure, taken generally about lines 5-5 of FIG. 2.

A seal assembly 70a is structurally coupled to the first end 62 of the cylinder body and includes seal member 72a and retaining clip 74a which is configured to mate with a structure within inner bore 68 to sandwich the seal member 72a in place. Similarly, seal assembly 70b is structurally coupled to the second end 64 of the cylinder body and includes seal member 72b and retaining clip 74b which is configured to mate with a structure within inner bore 68 to sandwich the seal member 72b in place. With the seals, the space between the seal members 72a, 72b and the shaft body 20 remains fluid-tight. As the cylinder body 60 straddles the central seal 38 of the shaft body 20, the inner bore 68 of the cylinder body 60 is effectively bisected into two separate chambers, one of which is in fluid communication with the first set of openings 39a, and the other of which is in fluid communication with the second set of openings 39b, both of which are shown in FIG. 5.

In operation of such an embodiment, to direct the slidable cylinder assembly 14 in either direction, fluid is directed through the appropriate fluid bore of the appropriate end cap 22a, 22b. For example, fluid can be directed through fluid bore 44a through end cap 22a, which would direct the slidable cylinder assembly toward the end cap 22a. As the fluid is directed through the end cap 22a, the fluid progresses from first end 52a through to second end 54a, and eventually into the central bore 34, and in particular the upper portion of the central bore 34a. As further fluid is directed, the fluid extends through the first set of openings 39a and into the chamber bounded by the shaft body 20 on the inside the inner bore of the cylinder body 60 the central seal 38 and the seal member 72a. As fluid pressure builds, the fluid pushes against the seal member 72a, causing the seal member, along with the cylinder body 60 to slide in the direction of the end cap 22a. The opposite fluid flow (i.e., through end cap 22b) can be utilized to force movement of the cylinder body 60 in the other direction.

Problematically, over time, the various seals deteriorate. In particular, the central seal 38, as well as the seal members 72a, 72b rot and wear out over time. Such wear eventually compromises the cavities and fluid chambers, causing the cylinder assembly 10 to leak and to fail to operate. In certain instances, although not prevalent, the seals 49a, 49b can be compromised. Heretofore, the typical repair procedure for such a problem is to provide a brand new cylinder assembly. This is problematic because most, if not substantially all of the components, other than a couple of seals are in fine working order. However, there is generally no reasonable manner to disassemble and reassemble the cylinder assembly.

The disclosure herein provides a method in which to remanufacture such a cylinder assembly. With particular reference to FIGS. 7 through 10 for the first end cap and FIGS. 13 through 16 for the second end cap, the shaft body is cut circumferentially at the first end (at cut 102a) and the second end thereof (at cut 102b), just below the portion of the shaft body 20 that is crimped (or otherwise permanently mechanically attached) into the respective upper channel 47a, 47b of each of the end caps. It is preferred that the length from opening 50a to opening 50b be carefully measured so that the critical length of the cylinder assembly is known.

Preferably, the shaft body 20 is cut at cuts 102a, 102b completely through without adversely cutting into the shaft engagement portions 40a, 40b of the end caps 22a, 22b (although slight marring and cutting may be inevitable). Once these cuts have been made, the shaft body can be separated from the end caps 22a, 22b. A light tap with a mallet, soft hammer or the like will dislodge the shaft engagement portions from the shaft body 20. It will be understood that in certain applications, it may be necessary to remove only one of the two end caps.

Once these have been removed, the retaining clips 74a, 74b can be removed from the cylinder body and the seal members 72a, 72b can likewise be removed. At such time, the cylinder body 60 can be slid beyond either of the first end 30 or the second end 32 of the shaft body 20, thereby exposing the central seal 38. Each of these seals can be replaced with new seals, and the cylinder body can be reassembled over the shaft body 20.

There are a number of different manners that the end caps 22a, 22b can be reattached to the respective first and second end of the shaft body 20. In particular, it is preferred that an assembly jig is provided which ensures that the original distance between the opening 50a and the opening 50b can be maintained. In one embodiment, the assembly jig comprises a flat rectangular rigid base having a length which substantially corresponds to the hydraulic cylinder assembly 10. On opposing ends, stops are mounted to the base. The stops are shaped and positioned so that they can cradle the opposing end caps 22a, 22b in the precise position that they should be maintained.

In one embodiment, the end caps 22a, 22b are coupled to the shaft body 20 through a bonding agent. An anaerobic adhesive or an epoxy adhesive can be thoroughly applied to the outer surface 46a, 46b of the respective shaft engagement portions 40a, 40b of the respective end caps 22a, 22b. Similarly, it can be applied to the central bore 34 of the shaft body 20 proximate the first end 30 and the second end 32 thereof. It is desirable to chamfer, or deburr the two ends of the shaft body to facilitate reassembly. It may likewise be desirable to roughen the surfaces prior to the application of the adhesive and/or epoxy, to enhance the surface area of the two mating surfaces. Roughening of the surfaces can be done through sanding, grinding, or other processes. Prior to the setting of the adhesive or epoxy, the assembled cylinder assembly is placed in the assembly jig to insure that the end caps 22a, 22b are in the correct position relative to each other and relative to the shaft body 20. Finally, the adhesive or epoxy is allowed to fully cure.

As the two end caps 22a, 22b are, in the embodiment shown, fixed to the vehicle, and therefor fixed in position, further mechanical coupling of the components is not required. However, it is contemplated that in certain embodiments, it may be desirable to provide an additional mechanical coupling of the components. One manner in which to achieve such a mechanical coupling is achieved through the addition of a snap ring that interfaces between the shaft engagement portion 40a, 40b and the central bore 34 of the shaft body 20.

With particular reference to FIGS. 7 through 10 such a structure can be used to supplement the adhesive or epoxy, or can be used in place of the adhesive or epoxy. In particular, the a snap ring groove 56a is positioned on the shaft engagement portion 40a between the upper channel 47a and the lower channel 48a. A mating groove 31 is positioned at the first end 30 of the shaft body 20 so that the groove 56a and the mating groove 31 correspond when the end cap 22a is mated with the shaft body 20. During assembly, a snap ring 90a is inserted into groove 56a and compressed so that the shaft engagement portion can be directed into the first end 30 of the shaft body 20. As the groove 56a reaches the mating groove 31, the snap ring 90a responds and expands into the mating groove 31, while also remaining, at least in part in groove 56a. The snap ring 90a therefore maintains the shaft body 20 locked with respect to the end cap 22a.

A similar construction can be accomplished with the second end cap 22b and is shown in FIGS. 13 through 16. In particular, a snap ring groove 56b is positioned on the shaft engagement portion 40b between the upper channel 47b and the lower channel 48b. A mating groove 33 is positioned at the second end 32 of the shaft body 20 so that the groove 56b and the mating groove 33 correspond when the end cap 22b is mated with the shaft body 20. During assembly, a snap ring 90b is inserted into groove 56b and compressed so that the shaft engagement portion can be directed into the second end 32 of the shaft body 20. As the groove 56b reaches the mating groove 33, the snap ring 90b responds and expands into the mating groove 33, while also remaining, at least in part in groove 56b. The snap ring 90b therefore maintains the shaft body 20 locked with respect to the end cap 22b.

It will be understood that while the snap ring is described as being compressed into the groove on the shaft engagement portion of the end caps, the snap ring can be expanded into the mating groove on the central bore of the shaft body and allowed to compress back into the groove when the end cap is positioned so that the two grooves correspond to each other.

In yet another embodiment, while less desirable, openings or slots can be cut or drilled into both of the shaft body and the respective end cap prior to disassembly. When reassembled, a structure (such as round stock or a clip or key can be inserted into the slot or the opening thereby locking the two structures together. While this may form a satisfactory joining method, it is less preferred, as it dramatically changes the outward appearance of the cylinder assembly 10, and could compromise the end caps or the shaft body in certain situations (or, at least weaken these structures).

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A method of remanufacturing a cylinder assembly having a shaft assembly with a shaft body and a slidable cylinder assembly extending over the shaft body, and a plurality of seals between the shaft body and the slidable cylinder to provide a plurality of fluid-tight chambers, the shaft body having opposing ends with a first end cap positioned at a first end and a second end cap positioned at a second end thereof, wherein the shaft body is permanently coupled to the end cap to preclude removal thereof, the method comprising the steps of:

cutting the shaft body at at least one end below the portion of the shaft body that is crimped to the end cap;
removing at least the first end cap;
removing the slidable cylinder assembly;
replacing at least one of the plurality of seals between the shaft body and the slidable cylinder;
repositioning the slidable cylinder assembly over the shaft body;
reattaching at least the first end cap with a mechanical attachment, wherein the step of reattaching the first end cap with a mechanical attachment further comprises the step of applying an anaerobic adhesive or an epoxy to at least one of a central bore of the shaft body and a shaft engagement portion of the first end cap; and joining the shaft body and the first end cap to each other;
providing a groove into a shaft engagement portion of the first end cap;
providing a mating groove within an central bore of the first end of the shaft body, wherein the mating groove corresponds to the groove in the shaft engagement portion of the first end cap;
providing a snap ring into one of the groove and the mating groove, and compressing or expanding, respectively the snap ring so as to substantially conceal the snap ring within the respective groove;
directing the first end cap into the central bore of the shaft body; and
expanding or compressing the snap ring when the groove and the mating groove correspond so as to extend the snap ring into both grooves, to in turn, lock the two in position relative to each other.

2. A method of remanufacturing a cylinder assembly having a shaft assembly with a shaft body and a slidable cylinder assembly extending over the shaft body, and a plurality of seals between the shaft body and the slidable cylinder to provide a plurality of fluid-tight chambers, the shaft body having opposing ends with a first end cap positioned at a first end and a second end cap positioned at a second end thereof, wherein the shaft body is permanently coupled to the end cap to preclude removal thereof, the method comprising the steps of:

cutting the shaft body at at least one end below the portion of the shaft body that is crimped to the end cap;
removing at least the first end cap;
removing the slidable cylinder assembly;

replacing at least one of the plurality of seals between the shaft body and the slidable cylinder;

repositioning the slidable cylinder assembly over the shaft body;

reattaching at least the first end cap with a mechanical attachment;

providing a groove into a shaft engagement portion of the first end cap;

providing a mating groove within an central bore of the first end of the shaft body, wherein the mating groove corresponds to the groove in the shaft engagement portion of the first end cap;

providing a snap ring into one of the groove and the mating groove, and compressing or expanding, respectively the snap ring so as to substantially conceal the snap ring within the respective groove;

directing the first end cap into the central bore of the shaft body; and expanding or compressing the snap ring when the groove and the mating groove correspond so as to extend the snap ring into both grooves, to in turn, lock the two in position relative to each other.

3. A method of remanufacturing a cylinder assembly having a shaft assembly with a shaft body and a slidable cylinder assembly extending over the shaft body, and a plurality of seals between the shaft body and the slidable cylinder to provide a plurality of fluid-tight chambers, the shaft body having opposing ends with a first end cap positioned at a first end and a second end cap positioned at a second end thereof, wherein the shaft body is permanently coupled to the end cap to preclude removal thereof, the method comprising the steps of:

cutting the shaft body at each end below the portion of the shaft body that is crimped to the end cap;

removing the first and second end caps;

removing the slidable cylinder assembly;

replacing at least one of the plurality of seals between the shaft body and the slidable cylinder;

repositioning the slidable cylinder assembly over the shaft body; and reattaching the first and second end caps with a mechanical attachment, wherein the step of reattaching the first and second end caps with a mechanical attachment further comprises the steps of:

applying an anaerobic adhesive or an epoxy to at least one of a central bore of the shaft body at a first end and a shaft engagement portion of the first end cap;

joining the shaft body and the first end cap to each other;

applying an anaerobic adhesive or an epoxy to at least one of a central bore of the shaft body at a second end and a shaft engagement portion of the second end cap;

joining the shaft body and the second end cap to each other;

providing a groove into a shaft engagement portion of the first end cap;

providing a mating groove within an central bore of the first end of the shaft body, wherein the mating groove corresponds to the groove in the shaft engagement portion of the first end cap;

providing a snap ring into one of the groove and the mating groove, and compressing or expanding, respectively the snap ring so as to substantially conceal the snap ring within the respective groove;

directing the first end cap into the central bore of the shaft body; and expanding or compressing the snap ring when the groove and the mating groove correspond so as to extend the snap ring into both grooves, to in turn, lock the two in position relative to each other.

4. The method of remanufacturing a cylinder assembly of claim 3 further comprising the steps of:

providing a groove into a shaft engagement portion of the second end cap;

providing a mating groove within an central bore of the central end of the shaft body, wherein the mating groove corresponds to the groove in the shaft engagement portion of the second end cap;

providing a snap ring into one of the groove and the mating groove, and compressing or expanding, respectively the snap ring so as to substantially conceal the snap ring within the respective groove;

directing the second end cap into the central bore of the shaft body; and expanding or compressing the snap ring when the groove and the mating groove correspond so as to extend the snap ring into both grooves, to in turn, lock the two in position relative to each other.

5. A method of remanufacturing a cylinder assembly having a shaft assembly with a shaft body and a slidable cylinder assembly extending over the shaft body, and a plurality of seals between the shaft body and the slidable cylinder to provide a plurality of fluid-tight chambers, the shaft body having opposing ends with a first end cap positioned at a first end and a second end cap positioned at a second end thereof, wherein the shaft body is permanently coupled to the end cap to preclude removal thereof, the method comprising the steps of:

cutting the shaft body at each end below the portion of the shaft body that is crimped to the end cap;

removing the first and second end caps;

removing the slidable cylinder assembly;

replacing at least one of the plurality of seals between the shaft body and the slidable cylinder;

repositioning the slidable cylinder assembly over the shaft body;

reattaching the first and second end caps with a mechanical attachment;

providing a groove into a shaft engagement portion of the first end cap;

providing a mating groove within an central bore of the first end of the shaft body, wherein the mating groove corresponds to the groove in the shaft engagement portion of the first end cap;

providing a snap ring into one of the groove and the mating groove, and compressing or expanding, respectively the snap ring so as to substantially conceal the snap ring within the respective groove;

directing the first end cap into the central bore of the shaft body; and expanding or compressing the snap ring when the groove and the mating groove correspond so as to extend the snap ring into both grooves, to in turn, lock the two in position relative to each other.

6. The method of remanufacturing a cylinder assembly of claim 5 further comprising the steps of:

providing a groove into a shaft engagement portion of the second end cap;

providing a mating groove within an central bore of the central end of the shaft body, wherein the mating groove corresponds to the groove in the shaft engagement portion of the second end cap;

providing a snap ring into one of the groove and the mating groove, and compressing or expanding, respectively the snap ring so as to substantially conceal the snap ring within the respective groove;

directing the second end cap into the central bore of the shaft body; and expanding or compressing the snap ring when the groove and the mating groove correspond so as to extend the snap ring into both grooves, to in turn, lock the two in position relative to each other.

* * * * *